Figure 1:
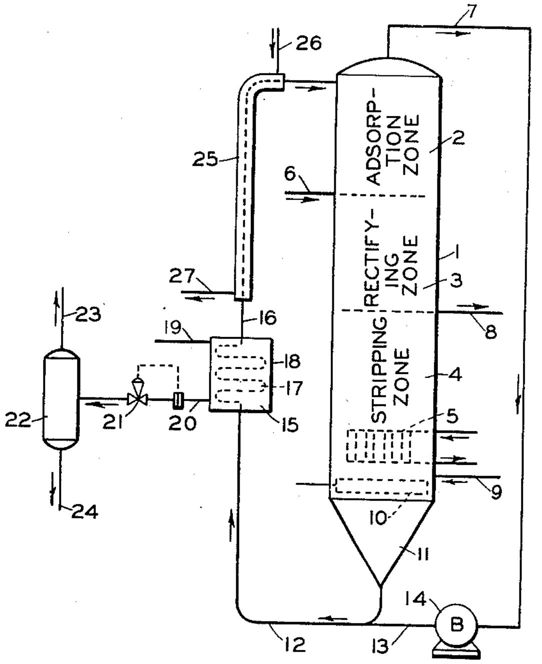

Sept. 14, 1954 F. E. GILMORE 2,689,112

COOLER FOR GASEOUS SUSPENSION OF A GRANULATED SOLID

Filed Aug. 30, 1949

INVENTOR.
F. E. GILMORE
BY Hudson and Young
ATTORNEYS

Patented Sept. 14, 1954

2,689,112

UNITED STATES PATENT OFFICE 2,689,112

COOLER FOR GASEOUS SUSPENSION OF A GRANULATED SOLID

Forrest E. Gilmore, Bartlesville, Okla., assignor to Phillips Petroleum Company, a corporation of Delaware Application August 30, 1949, Serial No. 113,036

6 Claims. (Cl. 257—229)

1

This invention relates to an improvement in a process, commonly termed a hypersorption process, wherein two or more components of a mixture are separated by selective adsorption on an adsorptive medium. In one of its aspects this invention relates to a method for cooling a hot, freshly-stripped adsorptive medium employed in a hypersorption process. In still another of its aspects this invention relates to a novel process for cooling a hot adsorptive medium wherein the said medium is suspended in an entrainment gas and passed upwardly through a cooling zone. In a still further aspect this invention relates to a novel heat exchange apparatus particularly adapted to cool a gaseous suspension of a hot adsorptive medium.

In the prior art, several processes are known for separating one or more components from a mixture thereof by selective adsorption onto a solid adsorptive medium. One such process is commonly termed a "hypersorption" process. This process comprises introducing a feed gas comprising two or more components, which are to be separated, into a slowly moving bed of solid granular adsorptive medium, such as activated carbon, which is contained in an elongated vertical hypersorption vessel and which is designed to adsorb the heavier components of the mixture. The adsorptive medium containing the adsorbed components is then contacted in a rectifying zone with a counter-current reflux of bottoms product from the process which contact serves to displace from the adsorptive medium any of the undesired lighter components originally adsorbed from the feed along with the desired heavier components. The adsorptive medium thus saturated with the desired heavier components or bottoms product next passes through a stripping zone which usually comprises a vertical tube bundle situated inside of the hypersorption vessel and heated externally, say, by condensing Dowtherm vapors. Additional stripping of the adsorbed components is accomplished by steam which is introduced into the moving bed of adsorbent below the Dowtherm heating section and which passes upwardly through the Dowtherm tube bundle counter-currently to the adsorptive medium being stripped. The steam and desorbed bottoms product or "make gas" are disengaged from the moving bed at a point above the stripping zone and just below the rectifying zone. The hot stripped adsorptive medium leaving the Dowtherm heater passes through a specially designed feed mechanism which provides a positive control of the adsorptive medium flow rate and which distributes the medium evenly over the cross section of the hypersorption vessel. From this mechanism, the adsorptive medium drops into a sealing leg which restricts the flow of steam downwardly from the stripping section. A gas lift system transports the adsorptive medium upwardly to the top of the hypersorber vessel where the flow is reversed by an impactless separation which reduces attrition to a minimum. The separated adsorptive medium flows by gravity into a hopper at the top of the hypersorber wherein an operating level of the adsorptive medium is maintained. The medium then flows downwardly by gravity into a vertically placed tubular heat exchanger wherein the medium is cooled to a temperature satisfactory for further adsorption in the succeeding adsorption zone. This completes one cycle of the adsorptive medium through the process. A typical hypersorption system and adjunct equipment is described by Bland in "Petroleum Processing," pages 635–638, July, 1948.

2

In the typical hypersorption process, the cooling, adsorbing, rectifying and heating zones are all arranged in a single vertical vessel in the order named with the cooling zone being placed at the top of the vessel and the heating zone at the bottom. The usual cooling zone is comprised of a bundle of tubes arranged within the hypersorption vessel in such a manner that the adsorbent to be cooled flows downwardly by gravity through the tubes while the cooling medium flows around the outside of the tubes and inside a shell formed by the walls of the hypersorption vessel. Such a system is not conducive to efficient heat exchange between the adsorbent and the cooling medium due to the low rate of flow of adsorbent through the tubes. Consequently the length of the heat exchange tubes must be relatively long in order to provide sufficient cooling for the adsorptive medium and as a result, the height of the hypersorption tower is unavoidably great. Another disadvantage in such a cooling system is often experienced whenever stripping steam injected into the moving adsorbent below the Dowtherm heater escapes into the gas lift system due to loss of level of adsorbent in the sealing leg. The steam escaping through the sealing leg travels upward with the adsorbent to the top of the hypersorption vessel and into the cooling zone. There it condenses on the adsorbent particles and effectively plugs up the tubes of the adsorbent cooler. The entire system must then be shut down and the clogged tubes cleaned of the wet adsorbent.

Further disadvantages in this system are found in the fact that the heat exchange equipment is in an elevated position, often as much as 160 feet above the ground where it is difficult to control, clean or repair. Likewise due to its height above the ground, the coolant employed must be pumped to a high elevation in order to circulate through the heat exchanger. Such a procedure is wasteful of pumping energy. Also, the adsorbent must be elevated to an even higher elevation in order to flow through the heat exchanger and hence this results in excessive power costs.

According to this invention, it has been found that the efficiency of a hypersorption process, wherein two or more components of a mixture are separated by selective adsorption onto an adsorptive medium, can be increased by cooling the freshly stripped hot adsorbent while it is suspended in an upwardly flowing gas stream. Still according to this invention, it has been found that the efficiency of a hypersorption process can be increased by cooling the hot freshly stripped adsorptive medium while it is being conveyed from the bottom of a hypersorption vessel to the top thereof whereby the uppermost cooling zone in a conventional hypersorption system can be eliminated with a resultant decrease in height to which the adsorbent must be elevated and to which the cooling medium must likewise be elevated and whereby the presence of steam in the cooling zone will not result in a clogging of said zone with wet adsorptive medium. Still further according to this invention, a novel type of heat exchanger has been invented which is especially adapted to rapidly cool a granular solid medium suspended in a gaseous carrier and which is further adapted to prevent clogging thereof with any of said medium which may separate from said carrier.

According to this invention the cooling zone at the top of a conventional hypersorption unit is dispensed with and the hot freshly stripped adsorptive medium is suspended in a gaseous carrier and passed through a novel heat exchanger especially adapted to cool a gaseous suspension of a solid granular medium. As a result, the hypersorption vessel comprises only 3 zones, namely, the adsorption, rectifying and stripping zones, thereby effectively reducing the height of said vessel. As stated, the hot, freshly regenerated adsorptive medium leaving the bottom-most zone of the hypersorption vessel is suspended in a gaseous carrier and passed through a heat exchanger wherein it is cooled as it is transported upwardly to the uppermost (adsorption) zone of the hypersorption vessel. It has been found that when employing this feature of the invention the height of the hypersorption vessel is decreased with a resultant decrease in the power consumed in elevating the adsorptive medium and the cooling medium to the top of the hypersorption vessel. Of even more importance, however, the employment of the process of this invention results in a marked increase in the rate of heat exchange between the hot adsorptive medium and the cooling medium flowing counter-currently in the cooling zone due to the rapid rate of flow of the adsorptive medium through the heat exchange equipment. A still further advantage flowing from the use of this system is that any steam which may be present in the gaseous carrier will not cause a clogging of the cooling zone by the adsorptive medium. Especially adapted heat exchangers are employed in this process whereby the cooling of the adsorbent is effectively accomplished without undue attrition of the adsorbent particles and without any substantial settling of the adsorbent from the gaseous carrier.

Figure 2:
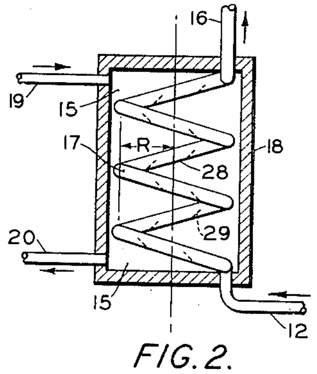
Figure 3:
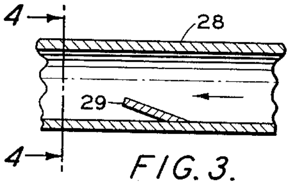
Figure 4:
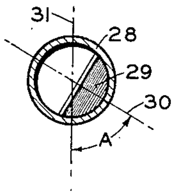
Figure 5:
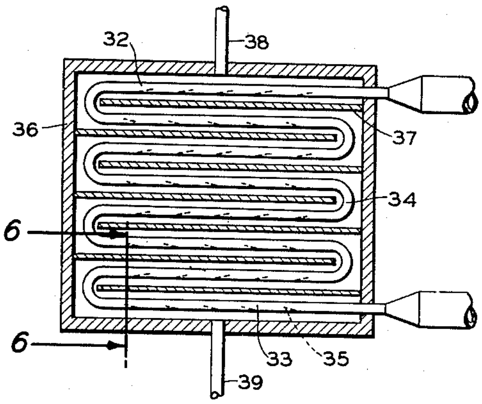
Figure 6:
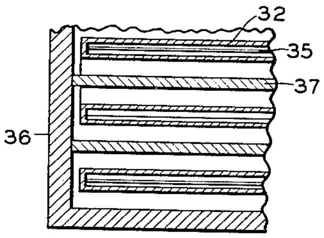

In order to more fully understand the invention, it will be described with special reference to the attached drawings wherein Figure 1 represents a schematic flow diagram of the process with particular reference to the cooling zone thereof. Figure 2 represents a novel type of heat exchanger especially adapted to be employed in the process of this invention. Figure 3 represents an enlarged view of the conduit employed in the heat exchanger of Figure 2. Figure 4 is a cross-sectional view taken on the line 4—4 as shown in Figure 3. Figure 5 is another type of heat exchanger particularly adapted to be used in the process of this invention. Figure 6 is a cross-sectional view taken on line 6—6 in Figure 5. In Figure 1, a slowly moving bed of adsorptive medium in hypersorption vessel 1 flows downwardly by gravity through adsorption zone 2, rectifying zone 3, stripping zone 4, heating zone 5, flow control zone 10, and hopper 11, in the order named. The feedstock which comprises a mixture of two or more components is introduced into adsorption zone 2 through line 6 and it flows upwardly through the adsorption zone 2 wherein heavier selected components of the feedstock are adsorbed in the downward flowing adsorptive medium and the lighter unadsorbed components leave the vessel through line 7. The adsorptive medium containing substantially all of the heavier components as well as unavoidably adsorbed minor portions of undesired light components flows downwardly from zone 2 into rectifying zone 3 wherein it is counter-currently contacted with vaporous reflux derived from stripping zone 4. This reflux is adsorbed on the adsorptive medium thereby displacing the undesired light components therefrom. The displaced light components then flow upwardly through zone 2 and out of the vessel through line 7. The adsorptive medium containing only the desired heavy components flows downwardly from zone 3 to stripping zone 4 and heating zone 5 wherein it is heated to a temperature sufficiently high to strip it of substantially all of the adsorbed materials. These desorbed heavy components are withdrawn from the hypersorption vessel through line 8.

Heating zone 5 comprises a tubular heat exchanger disposed in the lower portion of vessel 1 as shown. Dowtherm vapors, steam, or any other suitable medium may be employed therein. Stripping steam is introduced into the vessel through line 9 immediately below the heating zone 5. This steam aids in stripping the adsorptive medium. The stripping steam passes upwardly through vessel 1 along with the desorbed components and leaves the vessel through line 8. The hot, freshly stripped adsorptive medium flows through a control mechanism 10 which serves to regulate the flow of adsorbent through vessel 1, and to effect a uniform cross-sectional flow therethrough. After the hot adsorptive medium passes through hopper 11, it flows into line 12 wherein it is picked up by a gaseous carrier which is injected into line 12 through line 13. The gaseous carrier is usually comprised of overhead gases from line 7 and is propelled through line 13 by blower 14. The gaseous suspension of hot adsorptive material next passes upwardly through heat exchanger 15 and thence through line 16 back to the top of the hypersorption vessel thus completing a cycle of the process.

With special reference to the cooling system as shown in Figure 1, the suspension of hot adsorbent is passed upwardly through a cooling conduit 17 situated in a vessel 18. A satisfactory coolant, such as water or other medium is introduced into vessel 18 through line 19 wherein it flows downwardly and counter-currently to the gaseous suspension flowing through conduit 17. The coolant emerges from vessel 18 through line 20 and flow controller 21 and is discharged into vessel 22 wherein flash steam is removed through line 23 and hot water through line 24. The specific structure of cooling conduit 17 is more fully described below. Additional cooling area can be provided by surrounding line 16 with jacket 25 whereby the entrained adsorbent is additionally cooled as it is transported upwardly to the top of hypersorption vessel 1. A coolant, which can be from the same source as that employed in vessel 18 is introduced into jacket 25 through line 26 and removed therefrom through line 27.

The process of this invention can be employed to separate a mixture of materials having different adsorptive properties. Hence it can be used to separate ethane and ethylene from methane, propane from ethane, nitrogen from methane, hydrogen chloride from hydrocarbons, etc. The adsorptive medium employed is usually an activated charcoal such as apricot pit or coconut charcoal. Other media may also be used, including activated silica, activated alumina or activated carbon. The particle size of the adsorptive medium can range from about 12 to about 30 mesh size (Tyler screen size). The operating temperature of the hypersorption process will vary with the type of mixture being separated. For example, lower temperatures can be employed when separating ethane from methane than when separating butane from butylene. In general, the temperature in the adsorption zone will usually range from about 100° to about 150° F. The temperatures in the stripping zone will range from about 350° to about 700° F., but they can be even higher in order to desorb minor portions of heavy materials such as tars, polymers, etc., which enter with the feedstock. The pressure employed in the process will likewise vary with the material being treated but it can usually range from about atmospheric to about 300 pounds per square inch.

The velocity of the feed flowing upwardly through adsorption zone 2 should be quite low in order that the adsorptive medium therein will be effectively contacted with the feed with a resulting efficient adsorption of the desired components of the mixed feed. For example, vapor velocities in the range of about ¼ to 2, preferably from about ½ to 1, feet per second are satisfactory. Vapor velocities in the other zones contained in the hypersorption vessel are not critical. The velocity of the gaseous suspending agent entering line 12 through line 13 must be sufficiently high to readily suspend the adsorptive medium therein. The exact velocity of such gas will depend largely upon the size and shape of the particles of the adsorptive medium. When employing particles of adsorptive medium ranging from about 12 to about 30 mesh size, the velocity of the suspending gas can range from 10 to about 30 feet per second, preferably from about 15 to about 20 feet per second. The velocity of this particular gaseous stream should be closely adjusted in order to avoid centrifugal separation of the suspended particles in the cooling conduit 17 and also to avoid settling in vertical line 16. The factors which determine the exact velocity of the gaseous suspending agent in line 12, conduit 17, and line 16 are more fully discussed below.

This invention also relates to a novel type of heat exchange apparatus particularly adapted to be used in the above described process. Referring to Figure 2, one embodiment of this heat exchange apparatus is shown as a coil generally designated by the numeral 17. Coil 17 is comprised of a conduit 28 which is circular in cross-section and is coiled about a central axis in such manner that the radius of curvature R of coil 17 is constant. The exact radius of curvature chosen will depend upon the velocity of the gaseous suspension flowing through the coil. That is, if the radius of coil 17 is too small, an excessive centrifugal force will be developed by the flow of the adsorbent suspension through the coil so that the particles in suspension in the gas will be thrown out of suspension and against the outer walls of the conduit 28 thereby clogging the coil. On the other hand, the radius of curvature R should not be so large as to make the cooling coil 17 uneconomically large. We have found that, when employing the above specified vapor velocities, the radius of curvature R of coil 17 can be as small as 3 feet without clogging of the coil by centrifugal separation of the suspended partices from the entraining gas. The internal diameter of the conduit 28 which forms the coil 17 can be constant throughout the length of coil 17. In such case, the velocity of the suspension of adsorptive medium therethrough will decrease as the temperature of the suspension is decreased. Hence, as a preferred feature of this invention, the diameter of conduit 28 is varied to maintain the velocity of gaseous suspension constant. That is, the square of the diameter of conduit 28 is maintained proportional to the absolute temperature of the gaseous suspension. For example, if the diameter of conduit 28 at the inlet to coil 17 is 3 inches and the temperature of the gaseous suspension is reduced from 500° F. to 100° F. while flowing through coil 17, then the diameter of conduit 28 at the outlet from coil 17 should be about 2.3 inches. The diameter of the portion of conduit 28 between the inlet and the outlet to coil 17 can be decreased from 3 inches to 2.3 inches either in direct proportion to the length of conduit 28 or in direct proportion to the square root of the drop in absolute temperature of the gaseous suspension flowing through conduit 28. As a novel feature of this invention there is placed within the conduit 28 forming coil 17 a series of small fins 29 which radiate inwardly into the conduit 28 from the inner wall thereof as shown in Figure 3, which is an enlarged sectional view of a portion of the conduit 28 forming coil 17 taken along the longitudinal axis of the said conduit. These fins are further illustrated in Figure 4 which is a cross-sectional view on line 4—4. As shown, the fins 29 are surfaces which radiate inwardly toward the longitudinal axis of conduit 28 from the inner wall of conduit 28. The radial center line 30 of the fin 29 is displaced outwardly from the vertical diameter 31 of the conduit 28 in order that the center line of the fin will correspond approximately with the point at which the major portion of any adsorptive media tends to settle out in the coil. The angular displacement of the centerline of the fin from the vertical diameter of the coil is shown as A degrees in Figure 4. This angle A should be sufficient to permit the centerline of the fin to coincide with the point at which the entrained medium tends to settle out in the coil. Thus the separated medium will not settle out onto the bottom of conduit 28 because of the centrifugal force exerted thereon and, neither will the medium settle out completely on the horizontal axis of conduit 28 because of gravitational action on the separated particles of medium. Hence, the medium tends to settle out at a point between the horizontal axis of the conduit and the bottom of the cross section. Therefore, the centerline of fin 29 is coincident with this point of settling. Usually the fins will function properly to resuspend the settled media if the angle A of Figure 4 is between 30 and 50 degrees, preferably 45 degrees. The fin should be slanted downstream with the direction of flow. One means of forming a fin is to form it as a segment of a parabola and insert it into the circular conduit forming the coil so that the fin slopes downstream and is displaced from the vertical diameter of the conduit. However, other forms of fins can be employed and the term "fin" is used herein to designate any projection on the inside of a pipe or conduit which serves to resuspend any separated medium in the gaseous carrier. Thus, as the gaseous suspension of adsorptive media flows through the coil, any of the media which settles out onto the wall of the coil is scooped up by the fin and swept back into the center of the flowing gas stream where it is picked up again and conveyed along the length of the coil. A plurality of fins 29 are usually employed along the length of cooling coil 17 as shown in Figure 2. The exact number of fins should be great enough to prevent any substantial settling of the adsorptive medium in the coil. Usually if the fins are spaced from 1 to 3 feet apart, the adsorptive medium will be kept in suspension.

Figures 5 and 6 illustrate another embodiment of a cooling coil especially adapted to be used in the process of this invention. This particular embodiment can be substituted for coil 17. In the figure, conduit 32 corresponds to the conduit 28 of coil 17 of Figure 2 and forms a passageway for the gaseous suspension of hot adsorptive medium. As shown, conduit 32 comprises a length of conduit which has been folded or plaited into a series of S-shaped or undulated configurations. The straight portions of this conduit designated as 33 can extend for the width of the heat exchanger and terminate at their ends into a return elbow 34. The radius of the return elbow is governed by the same considerations as govern the radius of cooling coil 17 described above. The conduit 32 is rectangular in cross-section with the short side of the rectangle being disposed parallel with the length of the heat exchanger as shown in Figure 6 which is a cross-sectional view taken on the line 6—6 in Figure 5. This particular rectangular cross-sectional configuration of conduit 32 results in rapid cooling of the hot adsorptive material flowing therethrough since the distance through which the heat must be transferred is small as compared with the radius of a circular conduit of similar cross sectional area. Furthermore the turbulence of the suspension flowing through a rectangular section is greater than that flowing through a circular section. Hence the rate of heat transfer is greater for this section than for a circular section. The cross-sectional area of conduit 32 can be varied with the drop in temperature of the gaseous suspension flowing therethrough as explained above with reference to coil 17. Fins 35 are disposed along the length of conduit 32 similar to those disposed in coil 17.

These fins are situated along the bottom side of conduit 32 and thereby serve to elevate any separated adsorptive media back into the gas stream for resuspension therein. Since the adsorptive media which may separate in the elbow 34 will tend to fall back by gravity into the gas stream as it emerges from the elbow and thereby become resuspended in the gas, it is apparent that fins need not be located near the point where the gaseous suspension emerges from the return elbows. Hence, the majority of the fins 35 in conduit 32 should be located near the point where the straight portion 33 of the conduit joins the return elbow 34. The conduit 32 is surrounded by a vessel 36 constructed with baffles 37 extending between each of the plaits or undulations of conduit 32 so that a coolant entering vessel 36 through line 38 will flow substantially counter-current to the flow of gaseous suspension through conduit 32. The heated cooling media emerges from vessel 36 through line 39.

Variation and modification are possible within the scope of this invention the essence of which is that the efficiency of a hypersorption process can be improved by cooling the hot freshly stripped adsorptive medium while it is suspended in an upwardly flowing carrier gas whereby the rate of heat transfer from the hot medium is increased without undue attrition of the adsorbent medium particles and without any substantial settling of the said particles from the gaseous carrier and that a novel heat exchange apparatus especially adapted to be employed in the foregoing process has been provided.

I claim:

1. A heat exchange apparatus adapted to cool a gaseous suspension of a granular solid comprising a vessel having disposed therein a conduit of rectangular cross-section having a plurality of plaits along its longitudinal axis and with the long side of said rectangular cross-section of said conduit perpendicular to a plane through the longitudinal axis of said plaited conduit, said plaited conduit having a cross-sectional area which decreases along the length of said conduit in direct proportion to the decrease in the absolute temperature of said suspension flowing therethrough whereby the velocity of said suspension is maintained substantially constant throughout the length of said conduit, the radius of curvature of the upturning sections of said plaits being large enough to prevent particles from being thrown out of said suspension, said plaited conduit having disposed therein a plurality of fins along its inner bottom surface, each of said fins comprising a rectangle fastened along three of its sides to three sides of the said conduit and inclined in the direction of flow through said conduit, the majority of said fins being positioned near the point where a horizontal portion of said plait joins an upturning section of said plait, baffles disposed in said vessel to extend between the folds of each plait of said conduit whereby the coolant flowing through said vessel passes counter-currently to the flow of gaseous suspension through said conduit.

2. A heat exchange apparatus adapted to cool a gaseous suspension of a granular solid comprising a vessel having disposed therein a conduit of rectangular cross-section having a plurality of plaits along its longitudinal axis and with the long side of said rectangular cross-section of said conduit perpendicular to a plane through the longitudinal axis of said plaited conduit, the upturning sections of said plaits having a radius of curvature large enough to prevent particles from being thrown out of suspension, said plaited conduit having disposed therein a plurality of fins along its inner bottom surface, each of said fins comprising a rectangle fastened along three of its sides to three sides of the said conduit and inclined in the direction of flow through said conduit, the majority of said fins located in the straight portion of said plait near where said straight portion joins the upturning portion, baffles disposed in said vessel to extend between the folds of each plait of said conduit whereby the coolant flowing through said vessel passes counter-currently to the flow of gaseous suspension through said conduit.

3. A heat exchange apparatus adapted to cool a gaseous suspension of a granular solid comprising a vessel having disposed therein a conduit of rectangular cross-section and having a plurality of convolutions along its longitudinal axis and with the long side of said rectangular cross-section of said conduit perpendicular to a plane through the longitudinal axis of said convoluted conduit, a straight section of said conduit connecting two said convolutions which have a radius of curvature large enough to prevent particles from being thrown out of suspension, said convoluted conduit having disposed therein a plurality of fins along its inner bottom surface, each of said fins comprising a rectangle fastened to the bottom of said conduit and inclined in the direction of flow through said conduit, the majority of said fins being located near the juncture of a straight portion of said conduit with an upturning convoluted section of said conduit baffles disposed in said vessel to extend between the folds of each convolution of said conduit whereby the coolant flowing through said vessel passes countercurrently to the flow of gaseous suspension through said conduit.

4. A heat exchange apparatus adapted to cool a gaseous suspension of a granular solid comprising a convoluted conduit of rectangular cross-section and having the long side of said rectangular cross-section of said conduit perpendicular to a plane through the longitudinal axis of said convoluted conduit, the radius of curvature of a section joining two horizontal sections of said convolutions being large enough to prevent particles from being thrown out of suspension, said convoluted conduit having disposed therein a plurality of fins along its inner bottom surface, each of said fins comprising a rectangle fastened to the said conduit, the majority of said fins being located near each upturning section of said convoluted conduit and inclined in the direction of flow through said conduit.

5. A heat exchange apparatus adapted to cool a gaseous suspension of a granular solid comprising a conduit plaited along its longitudinal axis, said plaited conduit having disposed therein a plurality of fins inclined in the direction of flow and positioned along its inner bottom surface, the majority of said fins being located near the point where the straight portions of said plait join the upturning portions, whereby said granular solid is maintained as a suspension in said gas.

6. The heat exchange apparatus of claim 5, wherein said plaits have a radius of curvature of at least 3 feet.

References Cited in the file of this patent

UNITED STATES PATENTS

| Number | Name | Date |
|---|---|---|
| 565,866 | Winkel | Aug. 11, 1896 |
| 837,582 | Ordway | Dec. 4, 1906 |
| 849,579 | Siebel | Apr. 9, 1907 |
| 1,280,656 | Buhr | Oct. 8, 1918 |
| 1,363,955 | Conover | Dec. 28, 1920 |
| 1,531,974 | Reiser | Mar. 31, 1925 |
| 1,698,789 | Gillican | Jan. 15, 1929 |
| 1,785,159 | Ullman | Dec. 16, 1930 |
| 1,825,707 | Wagner | Oct. 6, 1931 |
| 2,348,009 | Johnson | May 2, 1944 |
| 2,449,822 | Schibbye | Sept. 21, 1948 |
| 2,476,472 | Arnold et al. | July 19, 1949 |
| 2,520,747 | Van Den Broek | Aug. 29, 1950 |

FOREIGN PATENTS

| Number | Country | Date |
|---|---|---|
| 345,279 | Great Britain | Mar. 17, 1931 |